United States Patent
Nguyen et al.

(10) Patent No.: US 10,060,244 B2
(45) Date of Patent: Aug. 28, 2018

(54) SYSTEM AND METHOD FOR HYDRAULIC FRACTURING WITH NANOPARTICLES

(71) Applicant: Halliburton Energy Services, Inc., Houston, TX (US)

(72) Inventors: Philip D Nguyen, Houston, TX (US); Jesse Clay Hampton, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/544,221

(22) PCT Filed: Feb. 24, 2015

(86) PCT No.: PCT/US2015/017355
§ 371 (c)(1),
(2) Date: Jul. 17, 2017

(87) PCT Pub. No.: WO2016/137448
PCT Pub. Date: Sep. 1, 2016

(65) Prior Publication Data
US 2018/0010435 A1    Jan. 11, 2018

(51) Int. Cl.
*E21B 43/267* (2006.01)
*C09K 8/80* (2006.01)
*C09K 8/66* (2006.01)

(52) U.S. Cl.
CPC ............ *E21B 43/267* (2013.01); *C09K 8/665* (2013.01); *C09K 8/80* (2013.01); *C09K 2208/10* (2013.01)

(58) Field of Classification Search
None
See application file for complete search history.

(56) References Cited

U.S. PATENT DOCUMENTS

| | | | | |
|---|---|---|---|---|
| 3,070,165 A | * | 12/1962 | Stratton | E21B 43/26 166/283 |
| 5,325,921 A | * | 7/1994 | Johnson | C09K 8/08 166/280.1 |
| 7,726,399 B2 | * | 6/2010 | Brannon | C09K 8/665 166/280.2 |

(Continued)

OTHER PUBLICATIONS

T.M. Al-Bazali, et al., SPE 96100 Measurement of the Sealing Capacity of Shale Caprocks, presented at the 2005 SPE Annual Technical Conference and Exhibition, Dallas, TX, Oct. 9-12, 2005.

(Continued)

*Primary Examiner* — Anuradha Ahuja
(74) *Attorney, Agent, or Firm* — McAfee & Taft

(57) ABSTRACT

A method for controlling fluid loss into the pores of an underground formation during fracturing operations is provided. Nanoparticles are added to the fracturing fluid to plug the pore throats of pores in the underground formation. As a result, the fracturing fluid is inhibited from entering the pores. By minimizing fluid loss, higher fracturing fluid pressures are maintained, thereby resulting in more extensive fracture networks. Additionally, nanoparticles minimize the interaction between the fracturing fluid and the formation, especially in water sensitive formations. As a result, the nanoparticles help maintain the integrity and conductivity of the generated, propped fractures.

20 Claims, 2 Drawing Sheets

(56) References Cited

U.S. PATENT DOCUMENTS

| | | | | |
|---|---|---|---|---|
| 8,066,073 | B2* | 11/2011 | Hutchins | C09K 8/80 166/279 |
| 8,783,352 | B2 | 7/2014 | Chenevert et al. | |
| 2003/0054962 | A1* | 3/2003 | England | C09K 8/62 507/117 |
| 2005/0107265 | A1* | 5/2005 | Sullivan | C09K 8/602 507/271 |
| 2005/0252659 | A1* | 11/2005 | Sullivan | C09K 8/506 166/280.1 |
| 2007/0289781 | A1 | 12/2007 | Rickman et al. | |
| 2010/0089580 | A1* | 4/2010 | Brannon | C09K 8/602 166/280.2 |
| 2010/0096139 | A1* | 4/2010 | Holcomb | C09K 8/536 166/308.1 |
| 2011/0144386 | A1 | 6/2011 | Tour et al. | |
| 2011/0240296 | A1 | 10/2011 | Dusterhoft et al. | |
| 2012/0132421 | A1* | 5/2012 | Loiseau | C09K 8/82 166/279 |
| 2012/0181019 | A1* | 7/2012 | Saini | B82Y 30/00 166/250.01 |
| 2012/0285692 | A1* | 11/2012 | Potapenko | E21B 21/003 166/308.1 |
| 2012/0322697 | A1* | 12/2012 | Zhang | C09K 8/68 507/205 |
| 2013/0220619 | A1* | 8/2013 | Chen | C09K 8/70 166/308.1 |
| 2013/0341020 | A1 | 12/2013 | Nguyen et al. | |
| 2013/0341022 | A1* | 12/2013 | Nguyen | C09K 8/032 166/279 |
| 2014/0060831 | A1* | 3/2014 | Miller | E21B 43/267 166/280.1 |
| 2014/0144635 | A1* | 5/2014 | Nguyen | E21B 43/267 166/281 |
| 2014/0151043 | A1* | 6/2014 | Miller | E21B 34/14 166/285 |
| 2014/0238673 | A1* | 8/2014 | Nguyen | E21B 43/025 166/278 |
| 2014/0291025 | A1 | 10/2014 | Chenevert et al. | |
| 2014/0374095 | A1* | 12/2014 | Ladva | C09K 8/80 166/280.2 |

OTHER PUBLICATIONS

T. Sensoy et al., SPE 124429 Minimizing Water Invasion in Shale Using Nanoparticles, presented at the 2009 SPE Annual Technical Conference and Exhibition, New Orleans, LA, Oct. 4-7, 2009.

Jihua Cai, et al., SPE 146979 Decreasing Water Invasion into Atoka Shale Using Non-modified Silica Nanoparticles, presented at the SPE Annual Technical Conference and Exhibition in Denver, CO, Oct. 30-Nov. 2, 2011.

* cited by examiner

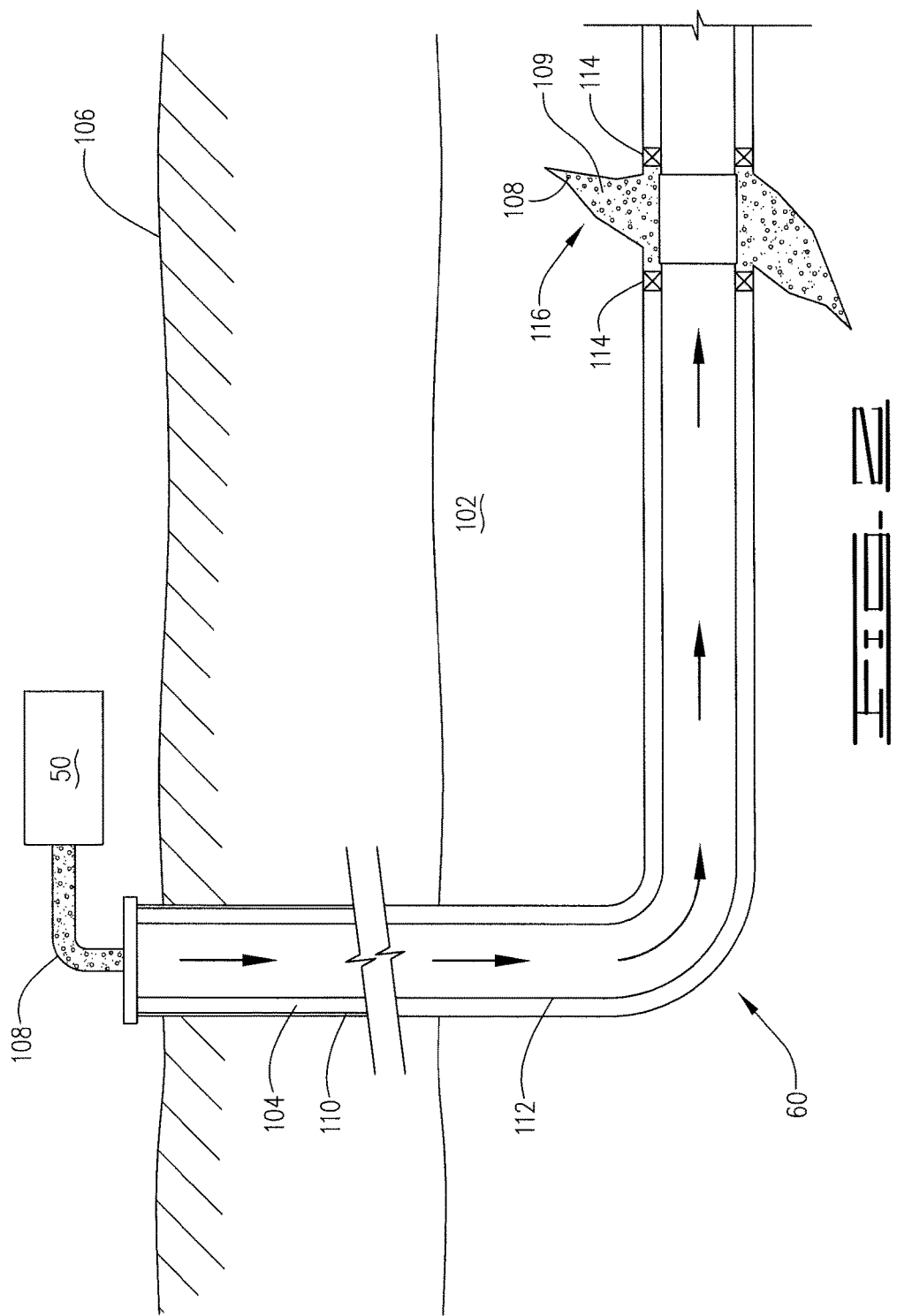

SYSTEM AND METHOD FOR HYDRAULIC FRACTURING WITH NANOPARTICLES

FIELD

This disclosure relates to enhancing oil and gas production and to hydraulic fracturing.

BACKGROUND

Conventional oil and gas drilling techniques produce economical quantities of hydrocarbons when performed on porous formations. Often, when a wellbore penetrates a porous formation, oil and gas flow into the low-pressure region created by the wellbore. However, less porous formations, also known as tight formations, can be inaccessible using conventional methods. Because oil and gas cannot easily flow through tight formations in economic quantities, such tight formations cannot usually be completed economically using only conventional completion techniques.

Previous methods of hydraulic fracturing allow impermeable formations to produce oil and gas in economic quantities. Generally, hydraulic fracturing methods pump a fluid into a formation at a pressure sufficient to cause the formation to fracture, thereby creating primary fractures. The primary fractures in the formation increase the effective porosity of the formation and allow for the economic production of hydrocarbons. When fluid under high pressure, such as the fracturing fluid, encounters pores in the underground formation, the fluid can enter the network of pores in the underground formation.

The entry of fluids into the pore network of a formation can have a deleterious effect on production, especially on formations comprising clays and water sensitive clays. The entry of fluids into such formations can cause the clay to swell, slough, degrade, release fines, or become ductile. The chemical and physical changes to the minerals often result in the blockage or closure of passageways that penetrate the subterranean formation, thereby causing a loss in permeability of the formation.

This loss in permeability impairs the flow of fluid through the wellbore and, in some cases, may even completely block the flow of fluids through portions of the formation. Loss in permeability often leads to a decrease in the production for the well. Moreover, some changes in the minerals may lead to sloughing, which yields fines capable of migrating and being produced with the formation fluids, thereby presenting potential abrasion and other problems with the production equipment and potential reduction in fracture conductivity.

BRIEF DESCRIPTION OF THE DRAWINGS

FIG. 2 is a diagram illustrating an example of an underground formation in which a fracturing operation may be performed in accordance with certain embodiments of the present disclosure.

DETAILED DESCRIPTION

Figure 1:
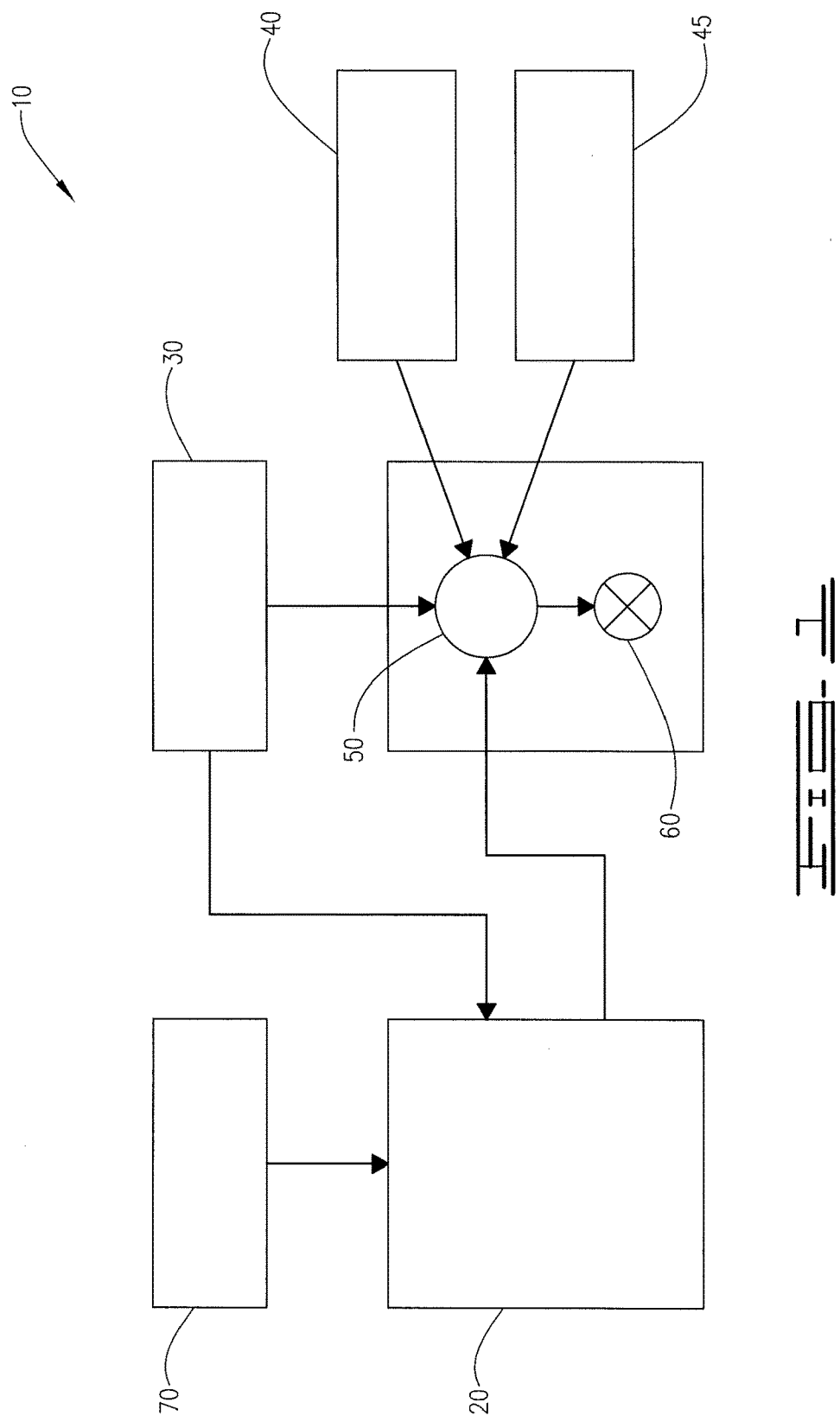
FIG. 1 is a diagram illustrating an example of a fracturing system that can be used in accordance with certain embodiments of the present disclosure.

The present application relates to controlling fluid loss during hydraulic fracturing. As used herein, hydraulic fracturing means forcing open fissures in an underground formation by introducing fluid at high pressure.

As used herein, an underground formation is a geological formation beneath the surface of the earth that potentially contains hydrocarbons or other valuable minerals. As used herein "into the underground formation" refers to movement underground into the underground formation and into cracks or fractures in the formation but not into the pores of the underground formation. For example, fluid pumped into a wellbore or into one or more hydraulic fractures moves "into the underground formation." As used herein, "into the pores of the underground formation" refers to movement into the pores of the underground formation. Thus, a fluid can be "in the underground formation" but not "in the pores of the underground formation." Generally speaking, pores are small holes in the underground formation that may form a network between one another. In contrast, a fracture in the formation is a crack or break in the underground formation that divides the formation.

The present disclosure is broadly applicable to a wide variety of underground formations, including tight formations. As used herein, a tight formation means an underground formation having an average permeability of 1 millidarcy or less. In some situations, a tight formation can be an underground formation having an average permeability of less than 1 microdarcy. In still other situations, an ultra tight formation can have an average permeability of between about 1 nanodarcy and between about 1 microdarcy.

In some cases, underground formations comprise a plurality of pores. Such pores also typically comprise one or more pore throats, which define the entrance and exits of the pore. The pores can exist as a network that allows for fluids to move in and between the pores comprising the network. Such pores allow for the migration of hydrocarbons out of the underground formation but also allow for the loss of fluid during the hydraulic fracturing process.

Although many diverse methods of hydraulic fracturing exist, such methods often comprise a pre-pad stage, a pad stage and a proppant, each of which can use one or more fracturing fluids. Specifically, such fracturing fluids can include a pre-pad fluid, a pad fluid and a proppant fluid, respectively. Generally, the pre-pad stage introduces pre-pad fluid into the underground formation at a pressure below the fracturing pressure of the formation to prepare the formation for further treatment at higher pressures. For example, the pre-pad stage can include introducing an acidic fluid into the underground formation to treat the underground formation. In accordance with this disclosure, pre-pad fluid can comprise an aqueous based fluid, a gelling agent acting as viscosifying agent or friction reducing agent, a clay stabilizing agent, and/or an acid.

The pad stage generally includes introducing a fluid at a pressure above the fracturing pressure of the formation that can be used to open up fractures within the formation. In accordance with this disclosure, pad fluid can comprise an aqueous based fluid, a gelling agent acting as a viscosifying agent or a friction reducing agent, and/or a clay stabilizing agent. In accordance with this disclosure, the pad fluid can include one or more nanoparticles and, optionally, one or more microproppants.

Finally, the proppant stage generally includes introducing a fluid carrying solid proppants that migrates into such fractures and hold the fractures open, thereby facilitating the production of hydrocarbons from the formation. Proppant fluids according to this disclosure can comprise an aqueous based fluid, a gelling agent acting as viscosifying agent or friction reducing agent, a clay stabilizing agent, a crosslinking agent, a breaking agent, and/or a proppant.

Suitable aqueous fluids that may be used in the above fracturing fluids include freshwater, salt water, brine, seawater or any other aqueous fluid that, preferably, does not adversely react with the other components used in accordance with the present disclosure or with the underground formation.

In accordance with the present disclosure, it has been found that the introduction of nanoparticles into the pad fluid can be advantageous. The nanoparticles can comprise a variety of materials, including silica, graphene, aluminum, iron, titanium, metal oxides, metal hydroxides and mixtures thereof.

In some embodiments, the pad fluid provided by the present disclosure can be substantially free or free of solid particles other than the nanoparticles provided by the present disclosure. For example, in some embodiments the pad fluid provided by the present disclosure can be substantially free of particles greater than about 100 nanometers in diameter, greater than about 60 nanometers in diameter, or greater than 30 nanometers in diameter.

In some embodiments, the nanoparticles are particles having a particle size from about 1 to about 100 nanometers in diameter. Further, such nanoparticles can have a particle size from about 3 to about 60 nanometers in diameter. In some embodiments, such nanoparticles can have a particle size from 5 to 30 nanometers in diameter on average. The appropriate diameter of the nanoparticles used in connection with the present disclosure depends on the average pore throat size of the underground formation being treated.

In some embodiments, it is desirable for the average nanoparticle diameter to be greater than the diameter of the average pore throat found in the underground formation. Although diameter can be interpreted to refer to a circle, the nanoparticles used in connection with the present disclosure need not be circular or spherical. Instead, the nanoparticles can take a variety of shapes in which case diameter refers to the length of their smallest dimension.

The pad fluid can further comprise microproppants. As used herein, microproppants are solid materials designed to keep hydraulic microfractures in an underground formation open. The use of microproppants can greatly enhance the conductivity of the complex fracture network. Microproppants are larger than nanoparticles and can have a particle size larger than 0.1 micron. Microproppants are smaller than proppants and can have a particle size less than 155 microns and typically less than 150 microns.

The microproppants used in connection with the present disclosure can have a variety of shapes. For example, the microproppants can have a roughly spherical, ovular, cylindrical or fibrous shape. In embodiments where the microproppants have a fibrous shape, the microproppants can have a diameter from about 0.1 micron to about 150 microns. Further, the microproppants having a fibrous shape can have a length from about 1 micron to about 2,000 microns.

The pad fluid comprising nanoparticles can be injected into an underground formation at a pressure above the fracturing pressure of the underground formation. As used herein, the fracturing pressure of the underground formation is the pressure at which fluids cause the underground formation to fracture. Introducing the pad fluid at a pressure above the fracturing pressure can cause fractures within the formation to open up and possibly induces new fractures into the formation.

The nanoparticles carried by the pad fluid can then interact with the pore throats of the pores in the formation. Because the nanoparticles are small but generally have a diameter larger than the pore throats, they plug or obstruct the pore throats. The plugged pore throats cause the pad fluid to resist movement into the pores and maintain a higher pressure for the pad fluid. As a result, the pad fluid is better able to open fractures in the formation instead of entering the pores of the formation. The plugging of pore throats by nanoparticles helps minimize aqueous fluid loss into the formation, thus minimizing the formation's interaction with the water-sensitive formation clays or minerals to help maintain the integrity of the generated fractures and their network.

Once the underground formation has been sufficiently fractured, the well can be put on production such that fluid in the well will flow back out of the well, carrying with it some percentage of the nanoparticles. Removing the nanoparticles from the underground formation removes obstructions from the pores, which improves the ability of the underground formation to produce commercial quantities of oil or natural gas or both. As used herein, putting the well on production means reducing the pressure of the fluid being applied to the well and thereby allowing the pressure of the underground formation to force fluids present in the underground formation and in the pores of the underground formation to flow back out of the underground formation.

Alternatively, the underground formation can be treated with a proppant before being put on production. Typically, the proppant fluid is introduced prior to the flow back operation. As used herein, the flowback stage is when flowback fluid is allowed to flow out of the formation through the wellbore and flow to the surface. As used herein, the combined pad and proppant fluids existing in the formation and in the pores of the formation can be referred to as a flowback fluid. For example, if a proppant fluid is injected into the formation after a pad fluid has been injected into the formation, a portion of the aqueous-based fluid of the proppant fluid and a portion of the aqueous-based fluid of pad fluid will mix to some extent and can flow back out of the formation as a combined flowback fluid.

The proppant fluid can carry proppants. As used herein, proppants are solid materials designed to keep a hydraulic fracture in an underground formation open. Proppants are larger than nanoparticles or microproppants and generally have a particle size larger than 150 microns. In some embodiments, the proppants have a particle size greater than 155 microns. In other embodiments, the particle size is in the range of from about 155 microns to about 1200 microns or from about 250 microns to about 500 microns.

Proppant and microproppant particulates suitable for use with the present disclosure may comprise any material suitable for use in subterranean operations. Suitable materials include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

Optionally, the proppant fluid may also contain nanoparticles. The nanoparticles in the proppant fluid serve a similar purpose to the nanoparticles in the pad fluid. As discussed, the nanoparticles will inhibit the movement of the proppant fluid into the pores of the formation.

The proppant fluid should be introduced into the formation at a pressure sufficient to place the proppant into the fractures of the underground formation and optionally extend the length of fractures of the formation. Generally, this pressure will be greater than the fracturing pressure of the underground formation.

Once the proppants in the proppant fluid have been adequately placed into the formation, the injecting pressure of the proppant fluid can be reduced by ceasing pumping, thereby allowing the fracture to close, preferably while the proppant particulates are still in neutral suspension within the proppant fluid.

During the flowback stage, the flowback fluid is allowed to flow out of the formation through the wellbore and flow to the surface. As used herein, the combined pad and proppant fluids existing in the formation and in the pores of the formation can be referred to as a flowback fluid. For example, if a proppant fluid is injected into the formation after a pad fluid has been injected into the formation, a portion of the aqueous-based fluid of the proppant fluid and a portion of the aqueous-based fluid of pad fluid will mix to some extent and can flow back out of the formation as a combined flowback fluid.

In some embodiments, the present disclosure can include adding tackifying agents to either the pad fluid or the proppant fluid to better enable the nanoparticles to plug the pore throats in the underground formation. Tackifying agents can include acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly (methyl methacrylate), poly(butyl methacrylate), and poly (2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, derivatives thereof, and combinations thereof. Esocorez™ as sold by ExxonMobil Corp. is an example of a suitable tackifying agent. The addition of such tackifying agents to the pad fluid can promote the ability of nanoparticles to plug the pore throats of the underground formation, thereby further inhibiting the introduction of the pad fluid into the underground formation. Further, some tackifying agents can be degradable such that flowback is not inhibited. For example, some tackifying agents can degrade with temperature and time.

In some embodiments, the present disclosure can include adding clay-stabilizing agents to either the pad fluid or the proppant fluid. Such clay stabilizing agents include Cla-Sta® as sold by Halliburton Energy Services, Inc., EZ-MUD® as sold by Halliburton Energy Services, Inc. or ZAP-clay as sold by ChemEOR, Inc. The addition of clay stabilizing agents to the aqueous fluid further inhibits movement of fluids into the formation. Other clay stabilizers include inorganic salts, including potassium chloride, sodium chloride, ammonium chloride, calcium chloride), and Cla-Web® as sold by Halliburton Energy Services, Inc.

In some embodiments, the present disclosure is suitable for use on an underground formation where the pore throats have an average diameter of from about 1 to about 100 nanometers. In other embodiments, the present disclosure is suitable for use on an underground formation in which the pore throats have an average diameter of from about 3 to about 60 nanometers. In other embodiments, the present disclosure is suitable for use on an underground formation in which the pore throats have an average diameter of from about 5 to about 30 nanometers.

In some embodiments, the present disclosure is suitable for use on underground formations in which the underground formation is a shale formation. In some embodiments, the present disclosure is suitable for use on an underground formation in which the underground formation is a sandstone formation. In some other embodiments, the formation is a carbonate formation.

In some embodiments, the pad fluid or the proppant fluid can contain a friction reducing agent, a gelling agent or a mixture thereof. Examples of friction reducing agents include CFR®2, CFR®3, CFR®SLE, CFR®6, CFR®8, as sold by Halliburton. Examples of suitable gelling agents include guar gums, hydroxypropyl guar, carboxymethyl hydroxypropyl guar, carboxymethyl guar, and carboxymethyl hydroxyethyl cellulose.

In some embodiments, the nanoparticles can make up from about 0.01 to about 10 grams of nanoparticles per 100 milliliters of the pad fluid. In some embodiments, the nanoparticles can make up from about 0.1 to about 8 grams of nanoparticles per 100 milliliters of the pad fluid. In some embodiments, the nanoparticles can make up from about 1 to about 7 grams of nanoparticles per 100 milliliters of the pad fluid. In some embodiments, the nanoparticles can make up from about 0.01 to about 2 grams of nanoparticles per 100 milliliters of the pad fluid.

In some embodiments, the nanoparticles are chosen in response to the specific attributes of the formation. For example, the operator of the method provided by the present disclosure will typically choose nanoparticles having an average diameter larger than the average diameter of the pore throats comprising the formation. Additionally, the nanoparticles can be chosen to have a flat edge or face in order to better plug the pore throats in the underground formation.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments.

In certain instances, the system 10 includes a fracturing fluid producing apparatus, which can produce a pad fluid or a proppant fluid, a fluid source 30, a proppant source 40, a nanoparticle source 45 and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used in pad or proppant operations during fracturing of the formation. The hydrated fracturing fluid can be a fluid for ready use in a fracture stimulation treatment of the well 60 or a concentrate to which additional fluid is added prior to use in a fracture stimulation of the well 60 or can be a fluid used to add proppants to be injected into the underground formation. In some embodiments, nanoparticles are premixed into a concentrated slurry and then the concentrated slurry is added to the fracturing fluid to obtain the desired concentration of nanoparticles in the fracturing fluid.

In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids. The proppant source 40 can include a proppant for combination with the fracturing fluid. The nanoparticle source 45 can include nanoparticles for combination with the pad fluid. The system may also include additive source 70 that provides one or more additives (e.g., gelling agents, weighting agents, and/or other optional additives) to alter the properties of the pad fluid or a proppant fluid.

For example, the other additives 70 can be included to reduce pumping friction, to reduce or eliminate the fluid's reaction to the geological formation in which the well is formed, to operate as surfactants, and/or to serve other functions. The pump and blender system 50 receives the fracturing fluid and combines it with other components as needed to produce the appropriate fracturing fluid, including proppant from the proppant source 40, nanoparticles from the nanoparticle source 45 and/or additional fluid from the additives 70. The resulting mixture may be pumped down the well 60 under a pressure sufficient to create or enhance one or more fractures in an underground formation, for example, to stimulate production of fluids from the formation.

Notably, in certain instances, the fracturing fluid producing apparatus 20, fluid source 30, nanoparticle source 45 and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluid in accordance with the present disclosure using continuous mixing or "on-the-fly" methods. Thus, for example, the pumping and blender system 50 can provide just pad fluid or just proppant fluid into the well at some times, and combinations of those components at yet other times.

FIG. 2 shows the well 60 performing a stage of hydraulic fracturing in a portion of an underground formation of interest 20 surrounding a well bore 104. The well bore 104 extends from the surface 106, and fracturing fluid 108 is applied to a portion of the underground formation 20 surrounding the horizontal portion of the well bore. Although shown as vertical deviating to horizontal, the well bore 104 may include horizontal, vertical, slanted, curved, and other types of well bore geometries and orientations, and the fracturing treatment may be applied to an underground zone surrounding any portion of the well bore. The well bore 104 can include a casing 110 that is cemented or otherwise secured to the well bore wall. The well bore 104 can be uncased or include uncased sections. Perforations can be formed in the casing 110 to allow pad fluids and/or other materials to flow into the underground formation 20. In cased wells, perforations can be formed using shape charges, a perforating gun, hydro jetting and/or other tools.

The well is shown with a work string 112 depending from the surface 106 into the well bore 104. The pump and blender system 50 is coupled with a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the underground zone 102. For example, the working string 112 may include ports adjacent the well bore wall to communicate the fracturing fluid 108 directly into the underground formation 20, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the underground zone 102. If nanoparticles are carried in the pad fluid, the nanoparticles can then obstruct pore throats in the underground formation 20 such that the fracturing fluid is inhibited from entering the pores of the underground formation. Additionally, the pressure of the fracturing fluid can be reduced to allow the fracturing fluid and the nanoparticles to flow out of the formation.

Proppant particles 109 can also be introduced into the formation along with a proppant fluid 108. The proppant particulates 109 in the proppant fluid enter the fractures 116 where they may remain after the proppant fluid flows out of the well bore during the back-flow operation. These proppant particulates 109 may "prop" fractures 116 such that fluids may flow more freely through the fractures 116. While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

In some embodiments, the present disclosure provides a method of hydraulically fracturing a tight formation having a fracturing pressure. The method can comprise providing a pad fluid, wherein the pad fluid comprises aqueous based fluid and nanoparticles, injecting the pad fluid through a wellbore to interact with the formation at a pressure above the fracturing pressure of the formation to open a fracture therein such that a plurality of pores having pore throats are exposed, wherein a portion of the nanoparticles plug one or more of the pore throats of the formation to thus limit entry of the fracturing fluid into the formation through the pores, providing a proppant fluid, wherein the proppant fluid comprises aqueous based fluid and a plurality of proppants, injecting the proppant fluid through the wellbore and into the formation at a flow rate sufficient to place the proppant into the fracture and to extend the length of the fracture.

In certain embodiments, the method can further include putting the well on production such that the aqueous-based pad fluid and/or formation fluid flows out of the formation and such that the nanoparticles dislodge from the pore throats and such that at least a portion of the nanoparticles are carried up the wellbore with the flowback fluid.

In other embodiments, the pad fluid comprises a clay-stabilizing agent.

In some further embodiments, the pad fluid comprises a microproppant.

In additional embodiments, the microproppant has a particle size ranging from about 0.1 to about 150 micrometers. Microproppants can have a fibrous shape and can have a diameter from about 0.1 micron to about 150 microns, and lengths ranging from about 1 micron to about 2,000 microns.

In additional further embodiments, the nanoparticles have a particle size ranging from about 1 to about 100 nanometers in diameter. In some other embodiments, the nanoparticles have a particle size ranging from about 3 to about 60 nanometers in diameter. In other embodiments, the nanoparticles have a particle size ranging from about 5 to about 40 nanometers in diameter.

In further additional embodiments, the nanoparticles are selected from the group consisting of silica, graphene, aluminum, iron, titanium, metal oxides, hydroxides and mixtures thereof.

In other embodiments, the pore throats have an average diameter of from about 5 to about 30 nanometers.

In still other embodiments, the proppant fluid can comprise nanoparticles.

In added embodiments, the underground formation is a shale formation. In other embodiments, the underground formation can be a sandstone formation. In some embodiments, the underground formation can be a carbonate formation.

In some embodiments the pad fluid or the proppant fluid contains a chemical selected from the group consisting of a friction reducing agent, a gelling agent and mixtures thereof.

In further embodiments, the nanoparticles can make up from about 0.01 to about 2 grams of nanoparticles per 100 milliliters of the pad fluid.

In other further embodiments, the nanoparticles have at least one flat face to thereby cover the pore throats and inhibit the movement of the pad fluid into the pores of the underground formation.

In other additional embodiments, the method can include creating a nanoparticle slurry and mixing the nanoparticle slurry and the pad fluid using mixing equipment.

In further additional embodiments, the pad fluid or the proppant fluid or both can be introduced into an underground formation using one or more pumps.

In added embodiments, the proppant has a particle size ranging from about 155 microns to about 1,200 microns in diameter. In other embodiments, the proppant has a particle size ranging from about 250 microns to about 500 microns in diameter.

In other added embodiments, the method can include putting the well on production such that the pad fluid and proppant fluid flow out of the formation and such that the nanoparticles dislodge from the pore throats and such that at least a portion of the nanoparticles are carried up the wellbore with the pad fluid and the proppant fluid.

In further added embodiments, the nanoparticles make up from about 0.01 to about 2 grams of nanoparticles per 100 milliliters of the pad fluid.

In another added embodiment, the disclosure provides a method of hydraulically fracturing an ultra-tight formation having a fracturing pressure. The method can comprise providing a pad fluid having a pressure, wherein the pad fluid comprises aqueous based fluid, microproppants, nanoparticles, and a tackifying agent; injecting the pad fluid through a wellbore to interact with the formation at a pressure above the fracturing pressure of the formation to open a fracture therein such that a plurality of pores having pore throats are exposed, wherein a portion of the nanoparticles plug one or more the pore throats of the formation to thus limit entry of the fracturing fluid into the formation through the pores; providing a proppant fluid, wherein the proppant fluid comprises aqueous based fluid and a plurality of proppants; injecting the proppant fluid through the wellbore and into the formation at a flow rate sufficient to place the proppant into the fracture and to extend the length of the fracture; putting the well on production such that the pad fluid flows out of the formation and such that the nanoparticles dislodge from the pore throats and such that at least a portion of the nanoparticles are carried up the wellbore with the pad fluid and the proppant fluid.

In such an embodiment, the nanoparticles can have a particle size of from about 1 to about 100 nanometers in diameter; the nanoparticles are selected from the group consisting of: silica, graphene, aluminum, iron, titanium, metal oxides, hydroxides and mixtures thereof; the nanoparticles make up from about 0.01 to about 10 grams of nanoparticles per 100 milliliters of the pad fluid; and the nanoparticles have at least one flat face to thereby cover the pore throats and inhibit the movement of the pad fluid into the pores of the underground formation.

What is claimed is:

1. A method of hydraulically fracturing a tight formation having a fracturing pressure and an average permeability of 1 millidarcy or less, the method comprising:
   a. providing a pad fluid. wherein said pad fluid comprises an aqueous based fluid and a plurality of nanoparticles;
   b. injecting said pad fluid into a well having a wellbore to interact with said tight formation at a pressure above said fracturing pressure of said tight formation to open a fracture therein such that a plurality of pores having pore throats are exposed, wherein a portion of said nanoparticles plug one or more of said pore throats of said tight formation to thus limit entry of said pad fluid into said tight formation through said pore throats, and wherein said pore throats have an average diameter from about 1 nanometer to about 100 nanometers, said nanoparticles have an average diameter from about 1 nanometer to about 100 nanometers, and said diameter of said nanoparticles allows said nanoparticles to become lodged in said pore throats to thus plug said pore throats;
   c. providing a proppant fluid, wherein said proppant fluid comprises an aqueous based fluid and a plurality of proppants; and
   d. injecting said proppant fluid through said wellbore and into said tight formation at a flow rate sufficient to place the proppants into said fracture and to extend the length of said fracture.

2. The method of claim 1 wherein a portion of said proppant fluid combines with a portion of said pad fluid in said tight formation to form a flowback fluid, the method further comprising putting the well on production such that said flowback fluid flows out of said tight formation and such that at least a portion of said nanoparticles dislodge from said pore throats and such that at least a portion of said nanoparticles are carried up said wellbore with said flowback fluid.

3. The method of claim 1, wherein said pad fluid further comprises a clay-stabilizing agent.

4. The method of claim 1, wherein said lad fluid farther comprises a micro-proppant.

5. The method of claim 4, wherein said micro-proppant has a particle size ranging from about 0.1 to about 150 microns in diameter.

6. The method of claim 1, wherein said pore throats have an average diameter of from about 3 nanometers to about 60 nanometers, and said nanoparticles have a particle size ranging from about 3 nanometers to about 60 nanometers in diameter.

7. The method of claim 1, wherein said pore throats have an average diameter of from about 5 nanometers to about 30 nanometers, and said nanoparticles have a particle size ranging from about 5 nanometers to about 30 nanometers in diameter.

8. The method of claim 1, wherein said nanoparticles comprise a material or materials selected from the group consisting of silica, graphene, aluminum, iron, titanium, metal oxides, hydroxides and mixtures thereof.

9. The method of claim 1, wherein said proppant fluid further comprises nanoparticles.

10. The method of claim 1, wherein said tight formation is a shale formation.

11. The method of claim 1, wherein said underground tight formation is a sandstone formation.

12. The method of claim 1, wherein said pad fluid or said proppant fluid contains a chemical elected from the group consisting of a friction reducing agent, a gelling agent and mixtures thereof.

13. The method of claim 1, wherein said nanoparticles make up from about 0.01 to about 2 grams of nanoparticles per 100 milliliters of said pad fluid.

14. The method of claim 1, wherein said nanoparticles have at least one flat face to thereby cover said pore throats and inhibits entry of said pad fluid into said pores of said tight formation.

15. The method of claim 1, further comprising creating a nanoparticle slurry and mixing said nanoparticle slurry and said pad fluid using mixing equipment.

16. The method of claim 1, wherein the pad fluid or said proppant fluid is introduced into said tight formation using one or more pumps.

17. The method of claim 1, wherein the proppants have a particle size ranging from about 155 microns to about 1,200 microns in diameter.

18. The method of claim 17 and wherein a portion of said proppant fluid combines with said a portion if said pad fluid in said tight formation to form a flowback fluid, and the method further comprises putting the well on production such that said flowback fluid flows out of said tight formation and such that at least a portion of said nanoparticles dislodge from said pore throats and such that at least a portion of said nanoparticles are carried up said wellbore with said flowback fluid.

19. The method of claim 18, wherein said nanoparticles make up from about 0.01 to about 2 grams of nanoparticles per 100 milleters of said pad fluid.

20. A method of hydraulically fracturing a tight formation having a fracturing pressure and an average permeability of 1 millidarcy or less, the method comprising:
  a. providing a pad fluid having a pressure, wherein said pad fluid comprises an aqueous based fluid, microproppants, first nanoparticles, and a tackifying agent;
  b. injecting said pad fluid into a well having a wellbore to interact with said tight formation at a pressure above said fracturing pressure of said tight formation to open a fracture therein such that a plurality of pores having pore throats are exposed, wherein a portion of said nanoparticles plug one or more said pore throats of said tight formation to thus limit entry of said pad fluid into said tight formation through said pores, and wherein said pore throats have an average diameter from about 1 nanometer to about 100 nanometers, said nanoparticles have an average diameter from about 1 nanometer to about 100 nanometers, and said diameter of said nanoparticles allows said nanoparticles to become lodged in said pore throats to thus plug said pore throats;
  c. providing a proppant fluid, wherein said proppant fluid comprises an aqueous based fluid, proppants and second nanoparticles;
  d. injecting said proppant fluid through said wellbore and into said tight formation at a flow rate sufficient to place the proppants into said fracture and to extend the length of said fracture and wherein said proppant fluid combines with said pad fluid in said tight formation to form a flowback fluid;
  e. putting the well on production such that said flowback fluid flows out of said tight formation and such that at least a portion of said first and second nanoparticles dislodge from said pore throats and such that at least a portion of said first and second nanoparticles are carried up said wellbore with said flowback fluid; and
wherein said first and second nanoparticles are selected from the group consisting of: silica, graphene, aluminum, iron, titanium, metal oxides, hydroxides and mixtures thereof; said first nanoparticles make up from about 0.01to about 2 grams of nanoparticles per 100 milliliters of said pad fluid; said first and second nanoparticles have at least one flat face to thereby cover said pore throats and inhibit the movement of said pad fluid into said pores of said tight formation; and said microproppants have a particle size from about 155 microns to about 1,200 microns in diameter.

* * * * *

UNITED STATES PATENT AND TRADEMARK OFFICE
CERTIFICATE OF CORRECTION

PATENT NO. : 10,060,244 B2
APPLICATION NO. : 15/544221
DATED : August 28, 2018
INVENTOR(S) : Philip D. Nguyen and Jesse Clay Hampton Page 1 of 1

It is certified that error appears in the above-identified patent and that said Letters Patent is hereby corrected as shown below:

In the Specification

Column 6, Line 14, delete "CFR®SLE" and replace with -- CFR®5LE --

In the Claims

Column 10, Claim 4, Line 61, delete "lad" and replace with -- pad --

Column 10, Claim 4, Line 61, delete "farther" and replace with -- further --

Column 11, Claim 11, Line 17, delete "underground"

Column 11, Claim 12, Line 20, delete "elected" and replace with -- selected --

Column 11, Claim 18, Line 40, delete "if" and replace with -- of --

Signed and Sealed this
Thirteenth Day of November, 2018

Andrei Iancu
*Director of the United States Patent and Trademark Office*